United States Patent
Kuo (10) Patent No.: US 12,360,020 B2
(45) Date of Patent: Jul. 15, 2025

(54) GAS DETECTION SYSTEM

(71) Applicant: Welmade Technology Corporation, Phoenix, AZ (US)

(72) Inventor: Yi-Nan Kuo, Hsinchu (TW)

(73) Assignee: Welmade Technology Corporation, Phoenix, AZ (US)

( * ) Notice: Subject to any disclaimer, the term of this patent is extended or adjusted under 35 U.S.C. 154(b) by 333 days.

(21) Appl. No.: 17/953,079

(22) Filed: Sep. 26, 2022

(65) Prior Publication Data

US 2024/0102893 A1    Mar. 28, 2024

(51) Int. Cl.
*G01N 1/20*    (2006.01)
*G01N 1/14*    (2006.01)

(52) U.S. Cl.
CPC ............. *G01N 1/2035* (2013.01); *G01N 1/14* (2013.01); *G01N 2001/1445* (2013.01); *G01N 2001/2057* (2013.01)

(58) Field of Classification Search
CPC ................... G01N 1/2035; G01N 1/14; G01N 2001/1445; G01N 2001/2057

USPC ...................................................... 73/863.86
See application file for complete search history.

(56) References Cited

U.S. PATENT DOCUMENTS

2021/0340486 A1*   11/2021   Andrews ................ C12M 23/44

* cited by examiner

*Primary Examiner* — Peter J Macchiarolo
*Assistant Examiner* — Rodney T Frank
(74) *Attorney, Agent, or Firm* — MUNCY, GEISSLER, OLDS & LOWE, P.C.

(57) ABSTRACT

A gas detection system includes a plurality of sampling assemblies, at least one detector and a control unit. The plurality of sampling assemblies respectively include at least one inlet channel, a first pump and a first valve. The first pump is communicated between the at least one inlet channel and the first valve, and the first valve is switchable between a sampling state and a pre-sampling state. The at least one detector is selectively communicated with the first valve of one of the plurality of sampling assemblies. The control unit is communicative with the plurality of sampling assemblies and controls said first valves of the plurality of sampling assemblies. When the first valve of one of the plurality of sampling assemblies is in the sampling state, the first valve of another one of the plurality of sampling assemblies is in the pre-sampling state.

1 Claim, 7 Drawing Sheets

GAS DETECTION SYSTEM

BACKGROUND OF THE INVENTION

Field of the Invention

The present invention relates to a gas detection system.

Description of the Prior Art

In the process of manufacturing semiconductors, air condition, especially airborne molecular contamination (AMC), in clean room environment has a great impact on the yield of the semiconductors. Specifically, AMC may damage the machining device, which results in high cost, yield-reducing and poor manufacturing quality; and AMC may also pollute the processed products and may consequently alter electrical, optical, and physical properties of the processed products, which also results in yield-reducing and poor manufacturing quality. Therefore, monitoring of AMC, such as acids (MA), bases (MB), condensables (MC) and dopands (MD), can help to reduce the problems as described above.

However, it takes a long time for sampling from a target area to a detector due to a long distance therebetween so that a conventional monitoring system cannot provide instant detection.

The present invention is, therefore, arisen to obviate or at least mitigate the above-mentioned disadvantages.

SUMMARY OF THE INVENTION

The main object of the present invention is to provide a gas detection system, which provides continuous multipoint detection with high efficiency.

To achieve the above and other objects, the present invention provides a gas detection system, including: a plurality of sampling assemblies, at least one detector and a control unit. The plurality of sampling assemblies respectively include at least one inlet channel, a first pump and a first valve. The first pump is communicated between the at least one inlet channel and the first valve, and the first valve is switchable between a sampling state and a pre-sampling state. The at least one detector is selectively communicated with the first valve of one of the plurality of sampling assemblies. The control unit is communicative with the plurality of sampling assemblies and controls said first valves of the plurality of sampling assemblies. When the first valve of one of the plurality of sampling assemblies is in the sampling state, the first valve of another one of the plurality of sampling assemblies is in the pre-sampling state. The first valve in the sampling state is communicated with the at least one detector, and the first valve in the pre-sampling state is non-communicated with the at least one detector and communicated with an external environment.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIGS. 1 to 7 for a preferable embodiment of the present invention. A gas detection system 1 of the present invention includes a plurality of sampling assemblies 10, at least one detector 20 and a control unit 30.

The plurality of sampling assemblies 10 respectively include at least one inlet channel 11, a first pump 12 and a first valve 13. The first pump 12 is communicated between the at least one inlet channel 11 and the first valve 13, and the first valve 13 is switchable between a sampling state and a pre-sampling state. The at least one detector 20 is selectively communicated with the first valve 13 of one of the plurality of sampling assemblies 10. The control unit 30 is communicative with the plurality of sampling assemblies 10 and controls said first valves 13 of the plurality of sampling assemblies 10. When the first valve 13 of one of the plurality of sampling assemblies 10 is in the sampling state, the first valve 13 of another one of the plurality of sampling assemblies 10 is in the pre-sampling state. The first valve 13 in the sampling state is communicated with the at least one detector 20, which allows gas from the at least one inlet channel 11 to be pumped into the at least one detector for detection; and the first valve 13 in the pre-sampling state is non-communicated with the at least one detector 20 and communicated with an external environment so as to pre-sampling gas to fulfill channels between the at least one inlet channel 11 and the first valve 13. Therefore, when the control unit 30 control the first valve 13 in the pre-sampling state to switch to the sampling state, the pre-sampled gas can be rapidly guided into the at least one detector 20, which provides continuous multipoint detection with high efficiency.

Specifically, each of the plurality of sampling assemblies 10 further includes a manifold 14 having a plurality of inlet ports 141 and an outlet port 142 disposed thereon. The plurality of inlet ports 141 is communicated with a plurality of said inlet channels 11, and the outlet port 142 is communicated with an inlet of the first pump 12. Each of the plurality of sampling assemblies 10 further includes a plurality of second valves 15 communicative with the control unit 30, and each of the plurality of second valves 15 is arranged between one of the plurality of inlet channels 11 and one of the plurality of inlet ports 141. Therefore, the control unit 30 can respectively control the plurality of second valves 15 in each of the plurality of sampling assemblies 10. In one of the plurality of sampling assemblies 10, when one of the plurality of second valves 15 is opened to allow one of the plurality of inlet channels 11 to be communicated with one of the plurality of inlet ports 141, the rest of the plurality of second valves 15 are closed so as to avoid gas pumped from non-target areas. Preferably, each said first pump 12 is normally running, and one of the plurality of second valves 15 of each of the plurality of sampling assemblies 10 is opened for sampling or pre-sampling, so that the gas pumped from said inlet channels 11 of different sampling assemblies 10 can be continuously detected in sequence. However, each said first pump may be controlled by the control unit so as to turn on and off according to respective one of said first valves.

In this embodiment, each said first valve 13 is a 3/2-way valve; the first valve 13 of each of the plurality of sampling assemblies 10 includes a first port 131, a second port 132 and a third port 133 communicatable with one another. The first port 131 is communicated with an outlet of one said first pump 12, the second port 132 is communicatable with the at least one detector 20, and the third port 133 is communicatable with the external environment. When one said first valve 13 is in the sampling state, the first port 131 is communicated with the second port 132; when the said first valve 13 is in the pre-sampling state, the first port 131 is communicated with the third port 133, which has a simple structure and is convenient to be arranged and controlled.

Preferably, the gas detection system 1 further includes a third valve 40 and a purge channel 50. The third valve 40 is arranged between the plurality of sampling assemblies 10 and the at least one detector 20 and is switchable between a sampling state and a purge state, and the purge channel 50 is configured for a purge gas (such as clean air, nitrogen, or the like) to flow therein and is communicatable with the third valve 40 and said first pumps 12 so as to clean gas channels. The gas detection system 1 further includes a fourth valve 60 disposed on the purge channel 50, and the fourth valve 60 is arranged between an inlet 51 of the purge channel 50 and the said first pumps 12. In this embodiment, the purge channel 50 is communicatable with one of the plurality of inlet ports 141 of the manifold 14 of each of the plurality of sampling assemblies 10, and the fourth valve 60 is arranged between the inlet 51 of the purge channel 50 and said inlet ports 141. When the third valve 40 is in the sampling state and the fourth valve 60 is closed, the purge channel 50 is non-communicated with the plurality of sampling assemblies 10 and the at least one detector 20. Please refer to FIG. 7, when the third valve 40 is in the purge state and the fourth valve 60 is opened, the purge channel 50 is communicated with at least one said inlet port 141 and the at least one detector 20, which allows respective manifold 14, first pump 12, first valve 13 and the at least one detector 20 to be cleaned at the same time. It is note that, the control unit 30 may control said second valves 15 to allow the purge channel 50 to be communicated with one or more of the plurality of sampling assemblies 10 according to operation requirements. Moreover, a first regulator 52 is arranged between the inlet 51 of the purge channel 50 and the third valve 40, and a second regulator 53 is arranged between the inlet 51 of the purge channel 50 and the said first pumps 12 (the fourth valve 60 in this embodiment) so as to respectively regulate the flow rate of the purge gas.

Figure 1:
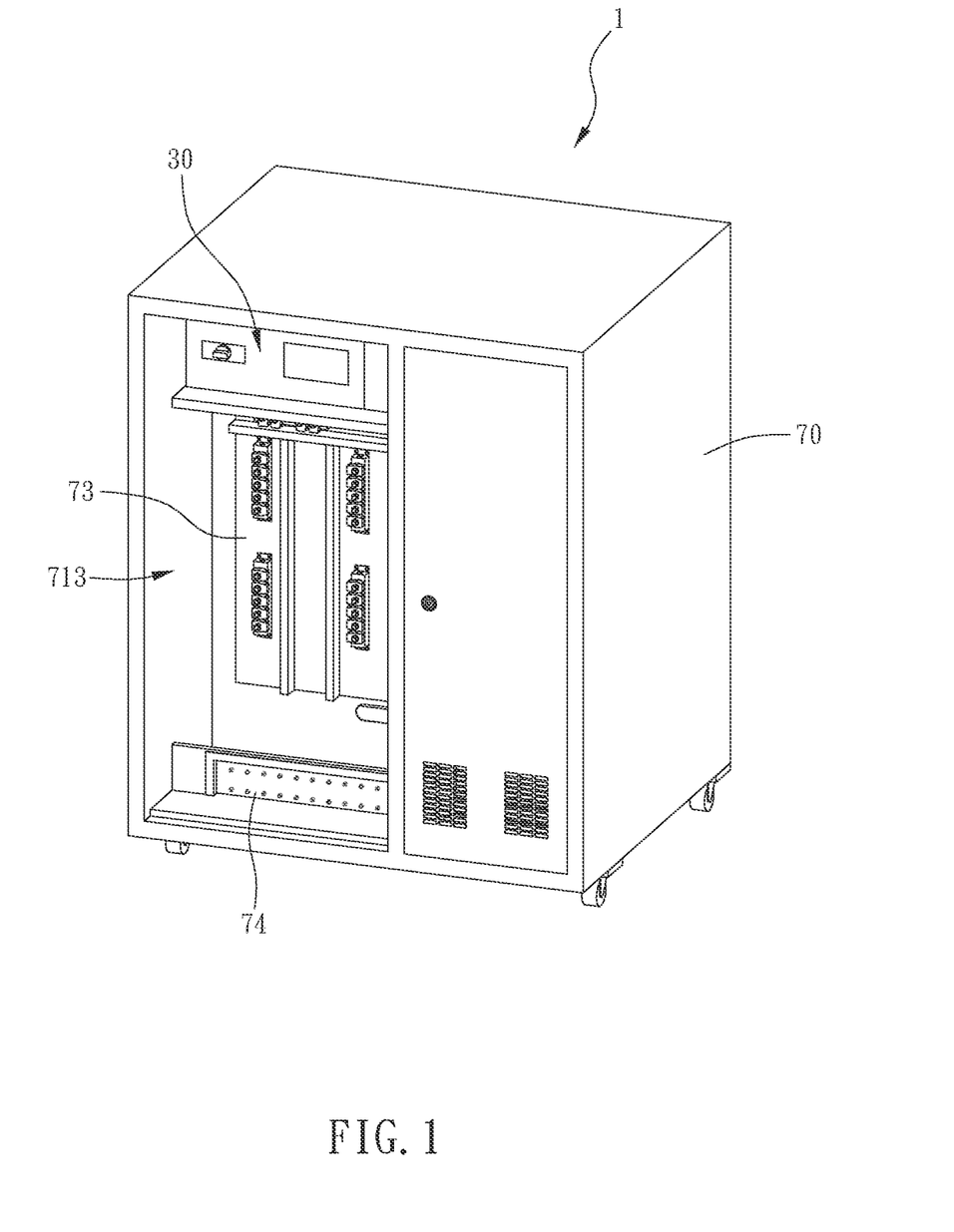
FIG. 1 is a stereogram of a preferable embodiment of the present invention.
Figure 2:
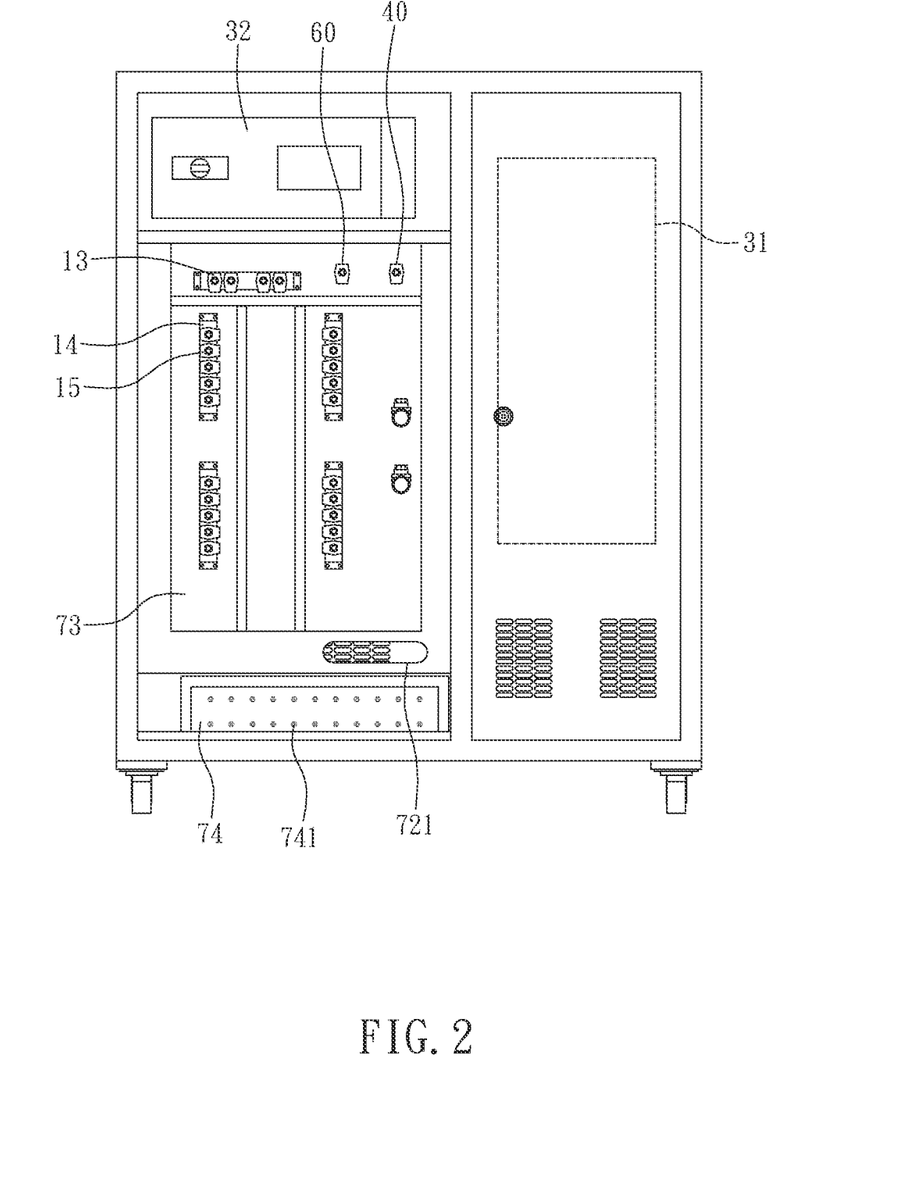
FIG. 2 is a rear view of a preferable embodiment of the present invention.
Figure 3:
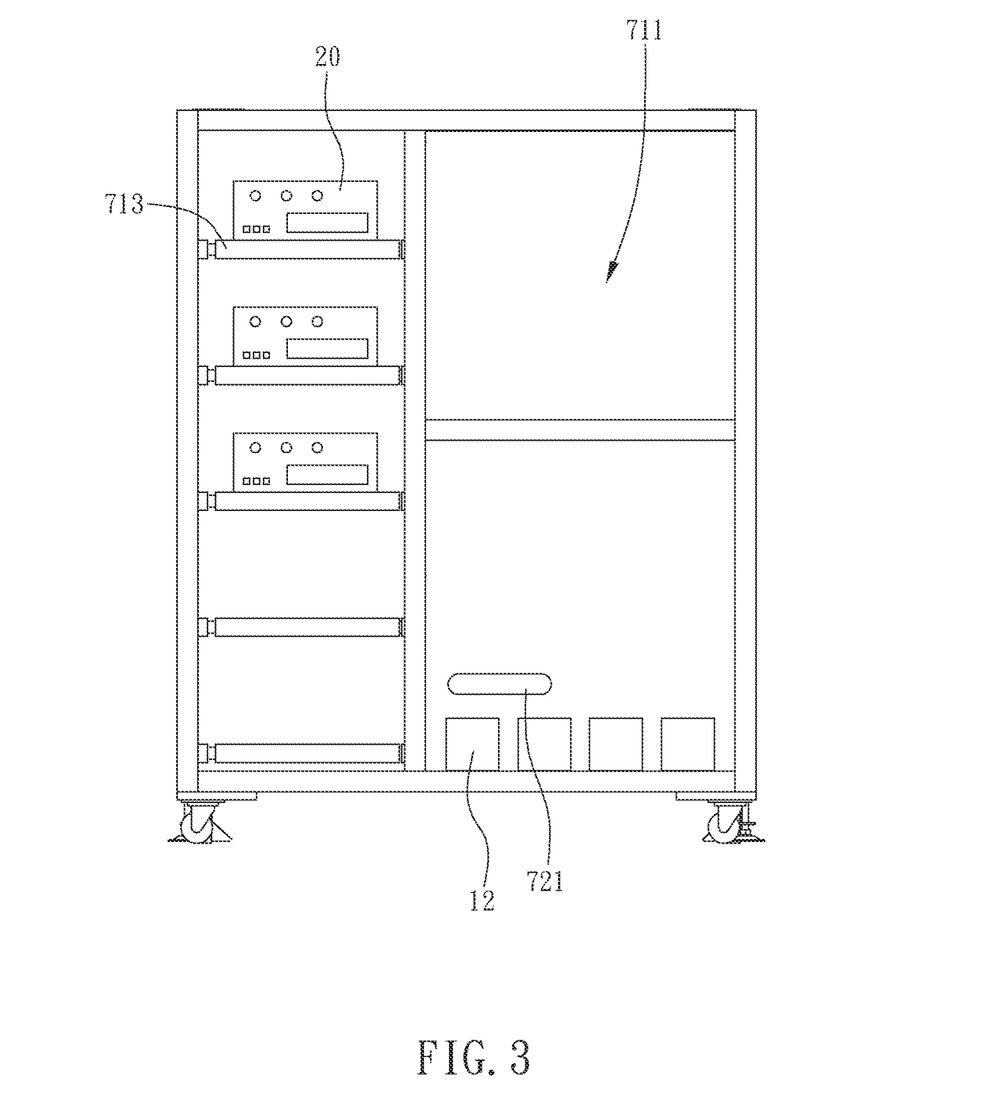
FIG. 3 is a front view of a preferable embodiment of the present invention.
Figure 4:
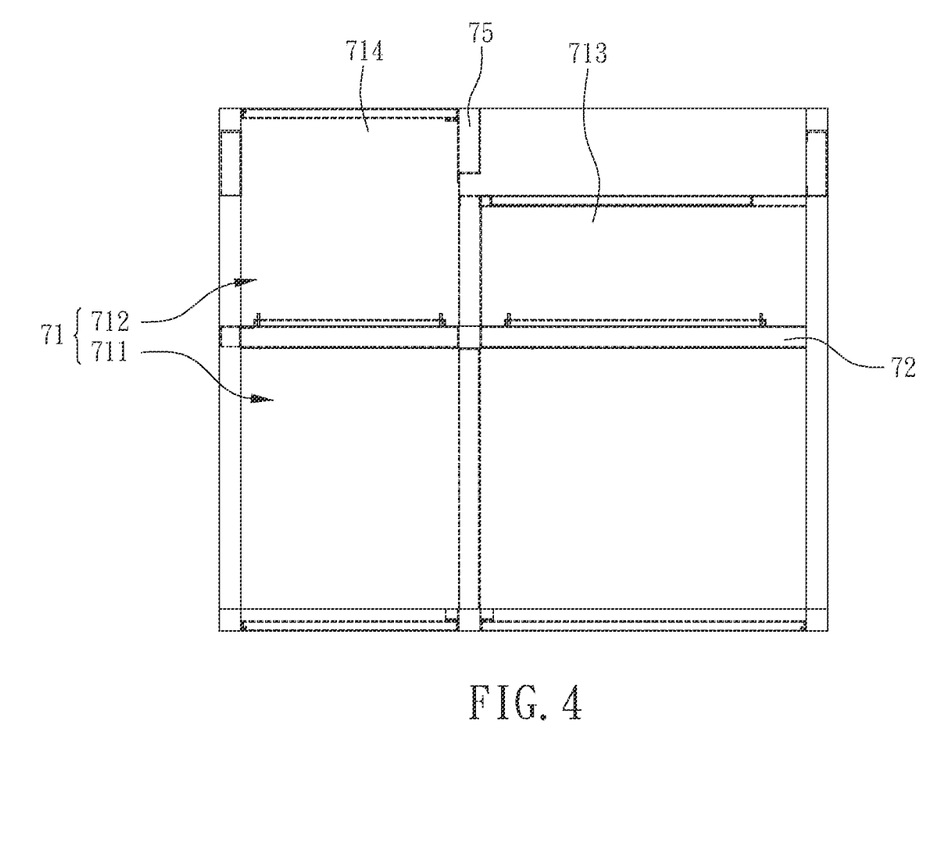
FIG. 4 is a top view of a preferable embodiment of the present invention.
Figure 5:
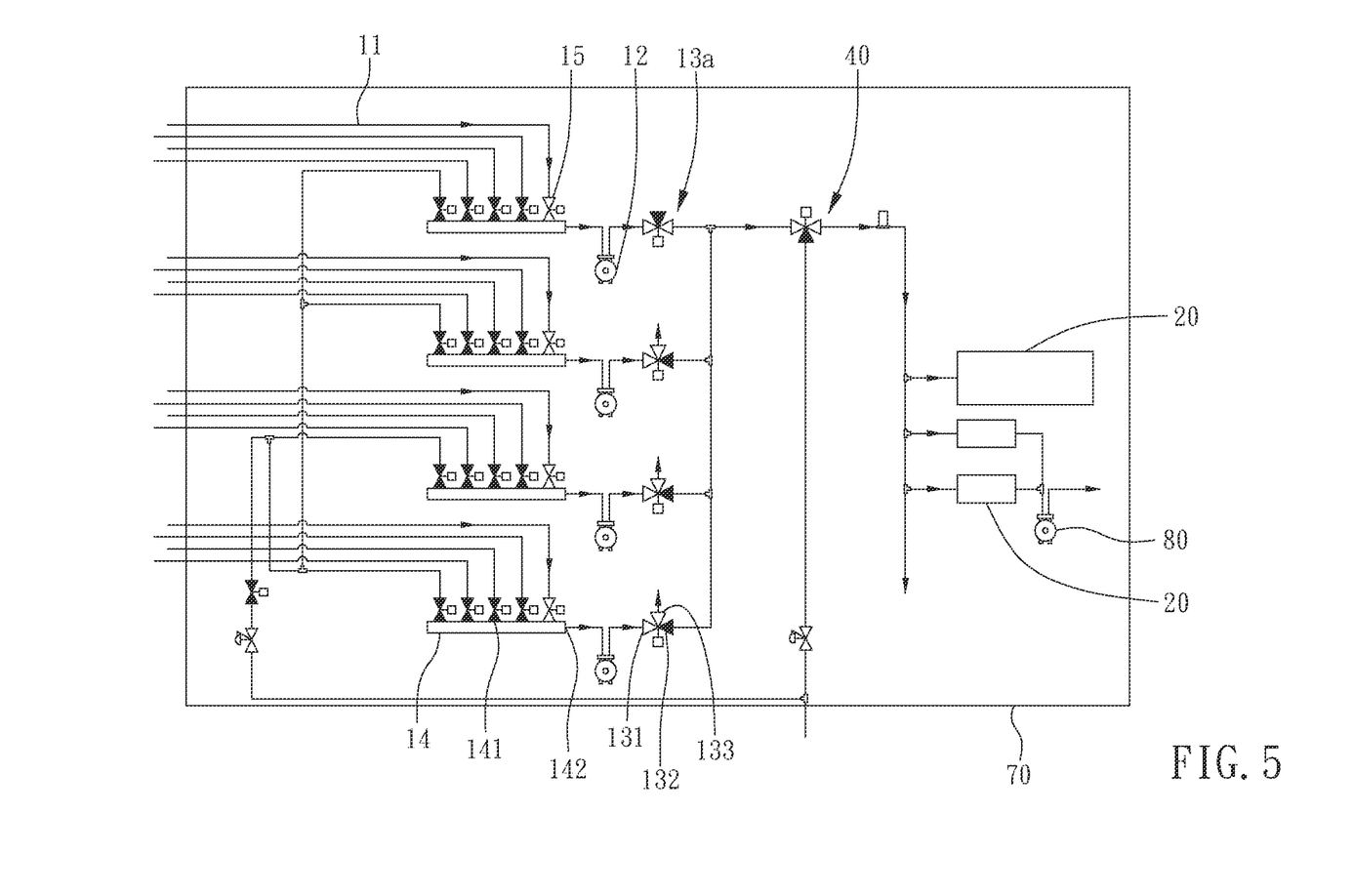
FIG. 5 is a gas flow diagram according to a preferable embodiment of the present invention when a first valve of a first one of a plurality sampling assemblies is in a sampling state.
Figure 6:
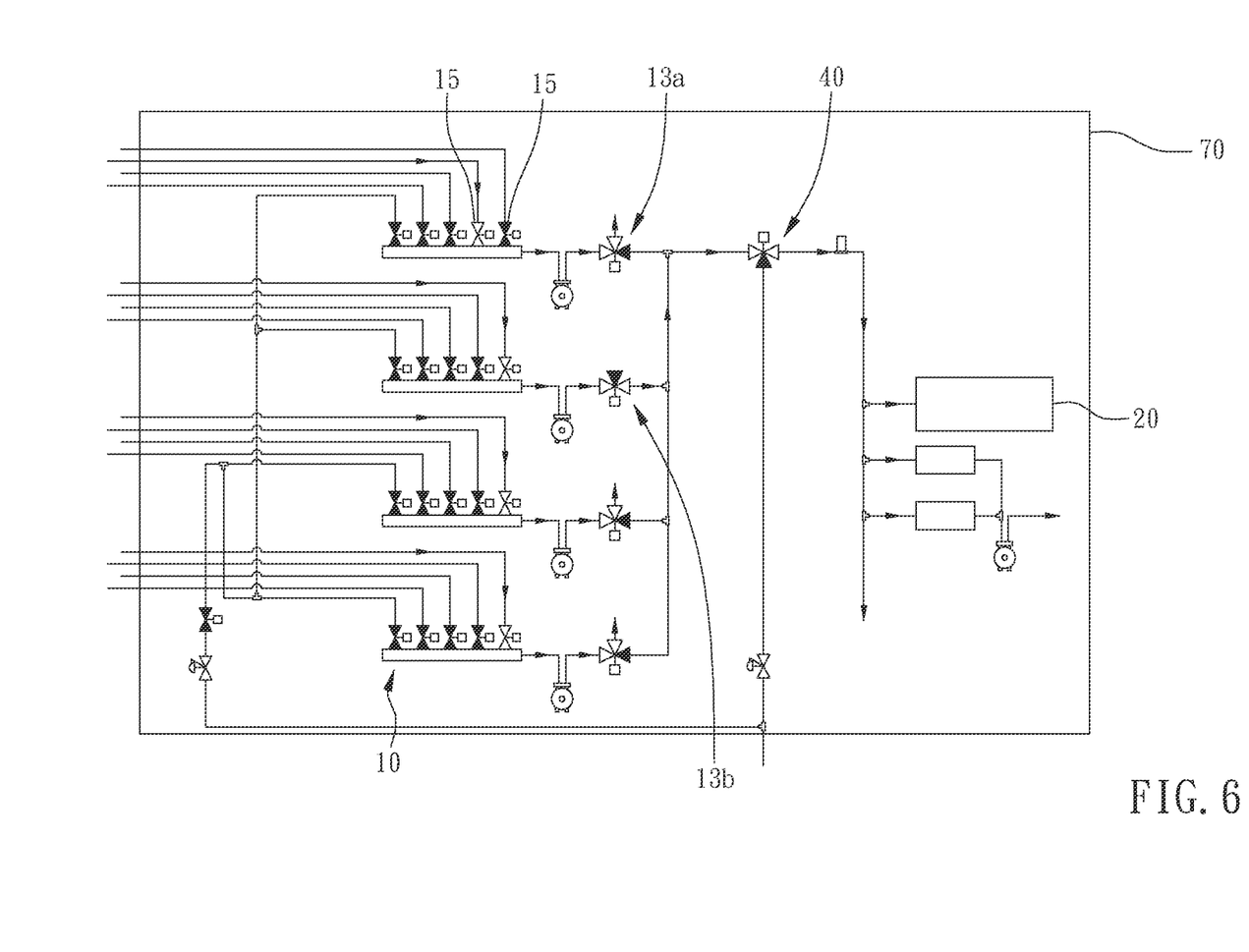
FIG. 6 is a gas flow diagram according to a preferable embodiment of the present invention when a first valve of a second one of the plurality sampling assemblies is in a sampling state.
Figure 7:
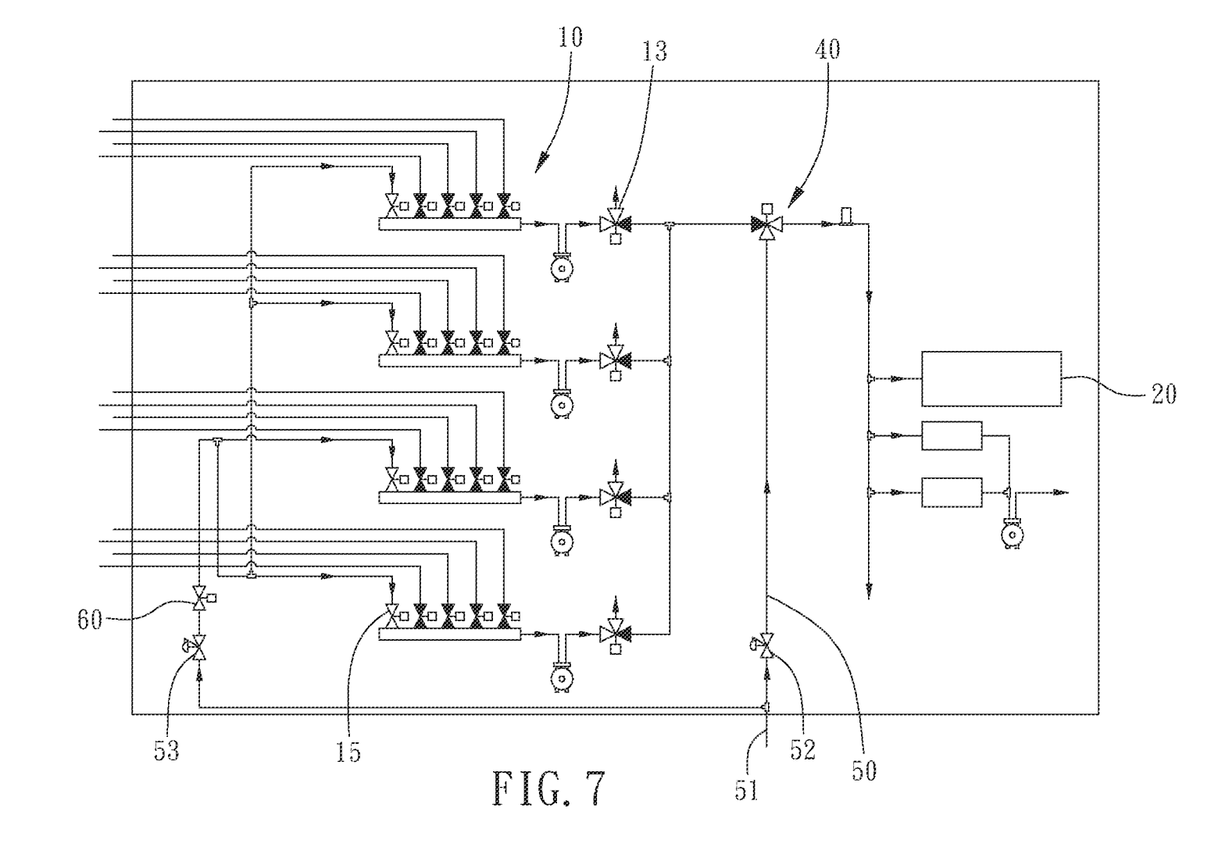
FIG. 7 is a gas flow diagram according to a preferable embodiment of the present invention when a third valve is in a purge state.

In this embodiment, the gas detection system 1 includes four said sampling assemblies 10, and the manifold 14 of each of the four said sampling assemblies 10 has five said inlet ports 141; one of the five said inlet ports 141 is communicated with the purge channel 50 and four of the five said inlet ports 141 is communicated with said inlet channels 11. Therefore, the four said sampling assemblies 10 can sample from 16 different sampling areas, which allows the gas detection system 1 to continuously detect and monitor air quality of the 16 sampling areas in sequence. In operation, the control unit 30 controls the first valve 13a of a first one of the four said sampling assemblies 10 to be in the sampling state, a first one of said second valves 15 of the first one of said sampling assemblies 10 to be opened, and the third valve 40 to be in the sampling state, as shown in FIG. 5. Thus, gas from a first sampling area can be pumped into the at least one detector 20 for detection. In the meantime, the first valve 13 of each of the rest of three said sampling assemblies 10 is in the pre-sampling state and a first one of said second valves 15 of each of the rest of three said sampling assemblies 10 is opened, which allows gas from second, third and fourth sampling areas to be respectively pre-sampling into said inlet channels 11. After that, as shown in FIG. 6, the control unit 30 controls the first valve 13a of the first one of the four said sampling assemblies 10 to be in the pre-sampling state and a second one of said second valves 15 of the first one of said sampling assemblies 10 is opened for pre-sampling gas from a fifth sampling area, and the first valve 13b of a second one of the four said sampling assemblies 10 is switched to the sampling state so as to detect gas from the second sampling area. Therefore, gas sampled from the 16 sampling areas can be monitored continuously in sequence as described above, which largely decreases sampling time and provides the gas detection system 1 with high efficiency.

In other embodiments, a number of the plurality of sampling assemblies and a number of the plurality of inlet ports of each manifold are changeable according to detection requirements; when the first valve of one of the plurality of sampling assemblies is in the sampling state, only the first valve communicated with the next sampling area may be in the pre-sampling state.

The gas detection system 1 further includes a rack 70. The rack 70 includes a receiving space 71 and a first partition 72 extending along a height direction of the rack 70, and the first partition 72 divides the receiving space 71 into a front portion 711 and a rear portion 712. The at least one detector 20 and said first pumps 12 are received within the front portion 711, and said first valves 13 are received within the rear portion 712. In this embodiment, the at least one detector 20 may include a UV fluorescence, an ion mobility spectrometer, or any other gas analyzers, which is selectively arranged according to analyzing requirements; the front portion 711 includes a plurality of drawers 713 configured for the at least one detector 20 to be disposed thereon so as to be convenient to operate and assembling. Moreover, the rack 70 further includes a first panel 73 and a second panel 74 received in the rear portion 712, the first panel 73 has the said first valves 13 disposed thereon, and the second panel 74 has a plurality of connectors 741 disposed thereon. Preferably, the first panel 73 is detachably disposed on the first partition 72, which is convenient to assembling, disassembling and maintenance. One end of each of the plurality of connectors 741 is configured to be connected with a sampling tube, and the other end of each of the plurality of connectors 741 is communicated with one of the said first valves 13 so that said sampling tubes can be orderly connected, which is convenient for maintenance and provides preferable appearance. Moreover, the first partition 72 has at least one through hole 721 communicated the front portion 711 with the rear portion 712, and the at least one through hole 721 is configured for at least one tube connected between the said first valves 13 and the said first pumps 12 to penetrate therethrough for easy arrangement of said tubes.

Specifically, the rear portion 712 includes a sampling area 713 and an electronic control area 714, the first panel 73 and the second panel 74 are disposed in the sampling area 713, and the control unit 30 is disposed in the electronic control area 714. In this embodiment, a second partition 75 is disposed between the sampling area 713 and the electronic control area 714; the control unit 30 includes a programmable logic controller 31 and a main switchboard 32 electrically connected with the programmable logic controller 31; the gas detection system 1 further includes at least one second pump 80 communicated with the at least one detector 20, the at least one second pump 80 is configured to exhaust gas from the at least one detector 20 so as to reduce interference and have high detection accuracy. With the structure as described above, the plurality of sampling assemblies 10, the at least one detector 20 and the control unit 30 are integrated into the rack 70 so that a volume of the gas detection system 1 is largely reduced and the gas detection system 1 is easy to be moved and arranged.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A gas detection system, including:
a plurality of sampling assemblies, respectively including at least one inlet channel, a first pump and a first valve, the first pump being communicated between the at least one inlet channel and the first valve, the first valve being switchable between a sampling state and a pre-sampling state;
at least one detector, selectively communicated with the first valve of one of the plurality of sampling assemblies; and
a control unit, communicative with the plurality of sampling assemblies and controlling said first valves of the plurality of sampling assemblies;
wherein when the first valve of one of the plurality of sampling assemblies is in the sampling state, the first valve of another one of the plurality of sampling assemblies is in the pre-sampling state; the first valve in the sampling state is communicated with the at least one detector, and the first valve in the pre-sampling state is non-communicated with the at least one detector and communicated with an external environment;
wherein each of the plurality of sampling assemblies further includes a manifold having a plurality of inlet ports and an outlet port disposed thereon, the plurality of inlet ports is communicated with a plurality of said inlet channels, and the outlet port is communicated with an inlet of the first pump;
wherein each of the plurality of sampling assemblies further includes a plurality of second valves communicative with the control unit, each of the plurality of second valves is arranged between one of the plurality of said inlet channels and one of the plurality of inlet ports; and in one of the plurality of sampling assemblies, when one of the plurality of second valves is opened to allow one of the plurality of said inlet channels to be communicated with one of the plurality of inlet ports, the rest of the plurality of second valves are closed;
wherein each said first pump is normally running, and one of the plurality of second valves of each of the plurality of sampling assemblies is opened
wherein the first valve of each of the plurality of sampling assemblies includes a first port, a second port and a third port communicatable with one another, the first port is communicated with an outlet of one said first pump, the second port is communicatable with the at least one detector, and the third port is communicatable with the external environment; the gas detection system further includes a third valve and a purge channel, the third valve is arranged between the plurality of sampling assemblies and the at least one detector and is switchable between a sampling state and a purge state, and the purge channel is configured for a purge gas to flow therein and is communicatable with the third valve and said first pumps; the gas detection system further includes a fourth valve disposed on the purge channel, wherein the fourth valve is arranged between an inlet of the purge channel and the said first pumps; the purge channel is communicatable with one of the plurality of inlet ports of the manifold of each of the plurality of sampling assemblies; when the third valve is in the sampling state and the fourth valve is closed, the purge channel is non-communicated with the plurality of sampling assemblies and the at least one detector; when the third valve is in the purge state and the fourth valve is opened, the purge channel is communicated with at least one said inlet ports and the at least one detector; a first regulator is arranged between the inlet of the purge channel and the third valve, and a second regulator is arranged between the inlet of the purge channel and the fourth valve; each said first valve is a 3/2-way valve; the gas detection system further includes a rack, the rack includes a receiving space and a first partition extending along a height direction of the rack, the first partition divides the receiving space into a front portion and a rear portion, the at least one detector and the said first pumps are received within the front portion, and said first valves are received within the rear portion; the rack further includes a first panel and a second panel received in the rear portion, the first panel has the said first valves, said manifolds and said second valves disposed thereon, the second panel has a plurality of connectors disposed thereon, one end of each of the plurality of connectors is configured to be connected with a sampling tube, and the other end of each of the plurality of connectors is communicated with one of the said first valves; the first partition has at least one through hole communicated the front portion with the rear portion, and the at least one through hole is configured for at least one tube connected between the said first valves and the said first pumps to penetrate therethrough; the rear portion includes a sampling area and an electronic control area, the first panel and the second panel are disposed in the sampling area, and the control unit is disposed in the electronic control area; the control unit includes a programmable logic controller; the gas detection system further includes at least one second pump communicated with the at least one detector, the at least one second pump is configured to exhaust gas from the at least one detector.

* * * * *